US010582463B2

(12) United States Patent
Grady et al.

(10) Patent No.: US 10,582,463 B2
(45) Date of Patent: *Mar. 3, 2020

(54) TIME BEACONS

(71) Applicant: Mueller International, LLC, Atlanta, GA (US)

(72) Inventors: Robert Henry Grady, Rumford, RI (US); David Edwin Splitz, Sandwich, MA (US); Dale McLeod Magley, Middleboro, MA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/021,581

(22) Filed: Jun. 28, 2018

(65) Prior Publication Data

US 2018/0310265 A1 Oct. 25, 2018

Related U.S. Application Data

(63) Continuation of application No. 15/065,423, filed on Mar. 9, 2016, now Pat. No. 10,070,403.

(51) Int. Cl.
*H04L 12/801* (2013.01)
*H04L 5/14* (2006.01)
(Continued)

(52) U.S. Cl.
CPC .......... *H04W 56/001* (2013.01); *H04L 25/20* (2013.01); *H04W 4/06* (2013.01)

(58) Field of Classification Search
CPC ... H04W 56/001; H04W 72/005; H04W 4/06; H04L 25/20
See application file for complete search history.

(56) References Cited

U.S. PATENT DOCUMENTS 5,252,967 A   10/1993  Brennan, Jr. et al.
5,371,734 A   12/1994  Fischer
(Continued)

FOREIGN PATENT DOCUMENTS

EP      2772074       8/2018
WO      2009133237    11/2009
(Continued)

OTHER PUBLICATIONS

Cullinan, Thomas; Final Office Action for U.S. Appl. No. 15/098,986, filed Apr. 14, 2016, dated Oct. 4, 2018, 27 pgs.
(Continued)

*Primary Examiner* — Faruk Hamza
*Assistant Examiner* — Abusayeed M Haque
(74) *Attorney, Agent, or Firm* — Taylor English Duma LLP

(57) ABSTRACT

Technologies are described herein for time-synchronizing multiple remote network nodes concurrently with time beacons. A hub device in the network, at a preconfigured start time, begins to periodically broadcast time beacons containing current time values retrieved from an accurate time source over a beacon period, while other nodes of the network, at the same preconfigured start time, start listening for time beacons. When a node receives a time beacon broadcast by the hub device, the node sets a real-time clock of the node to the current time value in the received time beacon.

20 Claims, 5 Drawing Sheets

(51) Int. Cl.
  *H04L 29/06* (2006.01)
  *H04W 56/00* (2009.01)
  *H04W 4/06* (2009.01)
  *H04L 25/20* (2006.01)

(56) References Cited

U.S. PATENT DOCUMENTS

| | | | |
|---|---|---|---|
| 5,594,776 | A | 1/1997 | Dent |
| 5,666,655 | A | 9/1997 | Ishikawa et al. |
| 5,774,733 | A | 6/1998 | Nolan |
| 5,787,358 | A | 7/1998 | Takahashi |
| 5,892,441 | A | 4/1999 | Woolley et al. |
| 5,963,557 | A | 10/1999 | Eng |
| 6,028,855 | A | 2/2000 | Hirsch |
| 6,031,466 | A | 2/2000 | Leshets et al. |
| 6,405,047 | B1 | 6/2002 | Moon |
| 6,717,926 | B1 | 4/2004 | Deboille et al. |
| 6,900,737 | B1 | 5/2005 | Ardalan |
| 7,123,628 | B1 | 10/2006 | Hwang |
| 7,202,800 | B2 | 4/2007 | Choi |
| 7,272,635 | B1 | 9/2007 | Longtin et al. |
| 7,313,164 | B1 | 12/2007 | Wilson et al. |
| 7,346,030 | B2 | 3/2008 | Cornwall |
| 7,420,942 | B2 | 9/2008 | Wang |
| 7,564,826 | B2 | 7/2009 | Sherman et al. |
| 7,729,329 | B2 | 6/2010 | Fujita et al. |
| 7,760,703 | B2 | 7/2010 | Kubler et al. |
| 7,830,874 | B2 | 11/2010 | Cornwall et al. |
| 7,843,379 | B2 | 11/2010 | Menzer et al. |
| 7,962,101 | B2 | 6/2011 | Vaswani et al. |
| 8,014,791 | B2 | 9/2011 | Guigne et al. |
| 8,194,636 | B1 | 6/2012 | Doherty et al. |
| 8,300,626 | B2 | 10/2012 | Thubert et al. |
| 8,375,134 | B2 | 2/2013 | Herzog et al. |
| 8,391,177 | B2 | 3/2013 | Picard |
| 8,577,044 | B2 | 11/2013 | Raikar |
| 8,660,134 | B2 | 2/2014 | Splitz |
| 8,797,871 | B2 | 8/2014 | Morandin |
| 8,855,569 | B2 | 10/2014 | Splitz |
| 8,918,091 | B1 | 12/2014 | Hoelzle et al. |
| 8,933,789 | B1 | 1/2015 | Fink et al. |
| 9,179,502 | B2 | 11/2015 | Fischer |
| 9,204,341 | B2 | 12/2015 | Su |
| 9,204,405 | B2 | 12/2015 | Hildebrandt et al. |
| 9,271,231 | B2 | 2/2016 | Nucci |
| 9,408,112 | B2 | 8/2016 | Su |
| 9,565,620 | B2 | 2/2017 | Dukes |
| 9,743,458 | B2 | 8/2017 | Jain et al. |
| 9,756,089 | B2 | 9/2017 | Brook |
| 9,807,793 | B2 | 10/2017 | Fischer |
| 9,854,607 | B1 | 12/2017 | Chu et al. |
| 9,883,548 | B2 | 1/2018 | Backholm et al. |
| 9,961,694 | B2 | 5/2018 | Gao et al. |
| 10,025,960 | B1 | 7/2018 | Fink et al. |
| 10,039,018 | B2 | 7/2018 | Splitz et al. |
| 10,070,403 | B2 | 9/2018 | Grady et al. |
| 10,097,411 | B2 | 10/2018 | Splitz et al. |
| 10,178,617 | B2 | 1/2019 | Splitz et al. |
| 10,200,947 | B2 | 2/2019 | Splitz |
| 10,267,652 | B1 | 4/2019 | Magley et al. |
| 2002/0051546 | A1 | 5/2002 | Bizjak |
| 2002/0159434 | A1 | 10/2002 | Gosior et al. |
| 2005/0078631 | A1 | 4/2005 | Cornwell |
| 2005/0190784 | A1 | 9/2005 | Stine |
| 2005/0249170 | A1 | 11/2005 | Salokannel et al. |
| 2006/0025136 | A1 | 2/2006 | Fujita et al. |
| 2006/0165031 | A1* | 7/2006 | Wang ............... H04W 52/02 370/328 |
| 2006/0187866 | A1 | 8/2006 | Werb |
| 2006/0245440 | A1 | 11/2006 | Mizukoshi |
| 2006/0268746 | A1 | 11/2006 | Wijting et al. |
| 2006/0274673 | A1* | 12/2006 | Fleury ............... H04L 12/413 370/254 |
| 2007/0014269 | A1 | 1/2007 | Sherman et al. |
| 2007/0057812 | A1 | 3/2007 | Cornwall |
| 2007/0091825 | A1 | 4/2007 | Budampati et al. |
| 2007/0250212 | A1* | 10/2007 | Halloran ............... A47L 5/30 700/245 |
| 2007/0286136 | A1 | 12/2007 | Rittle et al. |
| 2007/0293221 | A1 | 12/2007 | Hwang et al. |
| 2008/0043637 | A1 | 2/2008 | Rahman |
| 2008/0086560 | A1 | 4/2008 | Monier et al. |
| 2008/0240078 | A1 | 10/2008 | Thubert |
| 2009/0201169 | A1* | 8/2009 | d'Hont ............... G01S 13/003 340/8.1 |
| 2009/0268652 | A1 | 10/2009 | Kneckt et al. |
| 2010/0007521 | A1 | 1/2010 | Cornwall |
| 2010/0026517 | A1 | 2/2010 | Cumeralto et al. |
| 2010/0085954 | A1* | 4/2010 | Keshavarzian ....... H04W 84/18 370/343 |
| 2010/0097988 | A1 | 4/2010 | Chung |
| 2010/0195552 | A1* | 8/2010 | Ho ............... H04W 52/0216 370/311 |
| 2010/0329232 | A1 | 12/2010 | Tubb et al. |
| 2011/0018762 | A1 | 1/2011 | Walley et al. |
| 2011/0066297 | A1 | 3/2011 | Saberi |
| 2011/0140909 | A1 | 6/2011 | Olson et al. |
| 2011/0152970 | A1* | 6/2011 | Jollota ............... H04W 4/70 607/60 |
| 2011/0317019 | A1 | 12/2011 | Bahl et al. |
| 2012/0008536 | A1 | 1/2012 | Tervahauta et al. |
| 2012/0026007 | A1 | 2/2012 | Beattie |
| 2012/0115518 | A1 | 5/2012 | Zeira |
| 2012/0140622 | A1* | 6/2012 | Kruglick ............... H04W 8/005 370/230 |
| 2012/0201231 | A1* | 8/2012 | Omeni ............... H04B 7/2656 370/337 |
| 2013/0007231 | A1 | 1/2013 | Forssell |
| 2013/0064159 | A1 | 3/2013 | Edwards |
| 2013/0083722 | A1 | 4/2013 | Bhargava et al. |
| 2013/0094537 | A1 | 4/2013 | Hui et al. |
| 2013/0107772 | A1 | 5/2013 | Splitz et al. |
| 2013/0107999 | A1* | 5/2013 | Mainaud ............... H04J 3/0638 375/362 |
| 2013/0109319 | A1 | 5/2013 | Splitz et al. |
| 2013/0155925 | A1* | 6/2013 | Priyantha .......... H04W 52/0261 370/311 |
| 2013/0181848 | A1 | 7/2013 | Picard |
| 2013/0285855 | A1* | 10/2013 | Dupray ............... G01S 19/48 342/451 |
| 2013/0336245 | A1 | 12/2013 | Fischer |
| 2014/0028469 | A1 | 1/2014 | Ali |
| 2014/0028470 | A1 | 1/2014 | Ali |
| 2014/0044005 | A1* | 2/2014 | Keys ............... H04W 16/225 370/254 |
| 2014/0086124 | A1* | 3/2014 | Knowles ........... H04W 52/0277 370/311 |
| 2014/0120962 | A1* | 5/2014 | Merlin ............... H04W 68/02 455/466 |
| 2014/0314003 | A1* | 10/2014 | Zhou ............... H04W 48/16 370/329 |
| 2014/0329498 | A1 | 11/2014 | Cherian et al. |
| 2015/0003227 | A1 | 1/2015 | Splitz |
| 2015/0006633 | A1 | 1/2015 | Vandwalle et al. |
| 2015/0081814 | A1 | 3/2015 | Turakhia |
| 2015/0103818 | A1 | 4/2015 | Kuhn |
| 2015/0124698 | A1 | 5/2015 | Jain et al. |
| 2015/0223168 | A1* | 8/2015 | Bhanage ........... H04W 52/0216 370/311 |
| 2015/0257041 | A1 | 9/2015 | Su |
| 2015/0382283 | A1 | 12/2015 | Wang et al. |
| 2016/0050689 | A1 | 2/2016 | Fischer |
| 2016/0066249 | A1* | 3/2016 | Dukes ............... H04W 40/246 370/255 |
| 2016/0080980 | A1 | 3/2016 | Su |
| 2016/0192381 | A1 | 6/2016 | Gao et al. |
| 2016/0218833 | A1* | 7/2016 | Sapio ............... H04L 1/1628 |
| 2016/0249378 | A1* | 8/2016 | Zhou ............... H04W 72/1268 |
| 2016/0269971 | A1 | 9/2016 | Kim et al. |
| 2016/0292469 | A1 | 10/2016 | Ianni et al. |
| 2016/0373940 | A1 | 12/2016 | Splitz |
| 2017/0048659 | A1* | 2/2017 | Silvestri ............... H04W 4/023 |
| 2017/0164307 | A1 | 6/2017 | Zuniga et al. |

(56) References Cited

U.S. PATENT DOCUMENTS

| | | | |
|---|---|---|---|
| 2017/0265153 | A1 | 9/2017 | Grady et al. |
| 2017/0280450 | A1 | 9/2017 | Jeong et al. |
| 2017/0303103 | A1 | 10/2017 | Cullinan |
| 2017/0339016 | A1 | 11/2017 | Splitz |
| 2018/0014248 | A1 | 1/2018 | Splitz |
| 2018/0220354 | A1 | 8/2018 | Heil |
| 2018/0317169 | A1 | 11/2018 | Splitz et al. |
| 2019/0014393 | A1 | 1/2019 | Splitz et al. |
| 2019/0059116 | A1 | 2/2019 | Crohas |
| 2019/0110249 | A1 | 4/2019 | Splitz |
| 2019/0226873 | A1 | 7/2019 | Magley et al. |

FOREIGN PATENT DOCUMENTS

| | | |
|---|---|---|
| WO | 2013062571 | 5/2013 |
| WO | 2013062613 | 5/2013 |
| WO | 2016036475 | 3/2016 |
| WO | 2018203922 | 11/2018 |

OTHER PUBLICATIONS

Splitz, David Edwin; Corrected Notice of Allowance for U.S. Appl. No. 15/206,851, filed Jul. 11, 2016, dated Oct. 17, 2018, 13 pgs.

Splitz, David Edwin; Notice of Allowance for U.S. Appl. No. 15/206,851, filed Jul. 11, 2016, dated Sep. 20, 2018, 9 pgs.

Splitz, David Edwin; Issue Notification for U.S. Appl. No. 15/161,448, filed May 23, 2016, dated Sep. 19, 2018, 1 pg.

Splitz, David Edwin; Response to Amendment under Rule 312 for U.S. Appl. No. 15/161,448, filed May 23, 2016, dated Sep. 11, 2018, 6 pgs.

Splitz, David Edwin; Notice of Allowance for U.S. Appl. No. 15/583,263, filed May 1, 2017, dated Mar. 30, 2018, 13 pgs.

Magley, Dale McLeod; Non-Final Office Action for U.S. Appl. No. 15/877,548, filed Jan. 23, 2018, dated Sep. 17, 2018, 35 pgs.

Splitz, David Edwin; Office Action for Canadian patent application No. 2,850,059, filed Mar. 25, 2014, dated Dec. 13, 2018, 4 pgs.

Splitz, David Edwin; Corrected Notice of Allowance for U.S. Appl. No. 15/206,851, filed Jul. 11, 2016, dated Jan. 4, 2019, 9 pgs.

Splitz, David Edwin; Issue Notification for U.S. Appl. No. 15/583,263, filed May 1, 2017, dated Dec. 19, 2018, 1 pg.

Magley, Dale McLeod; Notice of Allowance for U.S. Appl. No. 15/877,548, filed Jan. 23, 2018, dated Dec. 10, 2018, 10 pgs.

Magley, Dale McLeod; Supplemental Notice of Allowability for U.S. Appl. No. 15/877,548, filed Jan. 23, 2018, dated Jan. 10, 2019, 7 pgs.

Cullinan, Thomas; Non-Final Office Action for U.S. Appl. No. 15/098,986, filed Apr. 14, 2016, dated Feb. 26, 2019, 15 pgs.

Splitz, David Edwin; Issue Notification for U.S. Appl. No. 15/206,851, filed Jul. 11, 2016, dated Jan. 16, 2019, 1 pg.

Magley, Dale McLeod; Supplemental Notice of Allowance for U.S. Appl. No. 15/877,548, filed Jan. 23, 2018, dated Mar. 14, 2019, 6 pgs.

Splitz, David Edwin; Office Action for Canadian application No. 2,861,675, filed Mar. 25, 2014, dated Mar. 5, 2019, 4 pgs.

Magley, Dale McLeod; Issue Notification for U.S. Appl. No. 15/877,548, filed Jan. 23, 2018, dated Jan. 3, 2019, 1 pg.

Splitz, David Edwin; Issue Notification for U.S. Appl. No. 13/283,526, filed Oct. 27, 2011, dated Feb. 5, 2014, 1 pg.

Splitz, David Edwin; Non-Final Office Action for U.S. Appl. No. 13/283,526, filed Oct. 27, 2011, dated Jun. 18, 2013, 67 pgs.

Splitz, David Edwin; Notice of Allowance for U.S. Appl. No. 13/283,526, filed Oct. 27, 2011, dated Oct. 9, 2013, 16 pgs.

Splitz, David Edwin; Non-Final Office Action for U.S. Appl. No. 15/161,448, filed May 23, 2016, dated Sep. 22, 2017, 32 pgs.

Splitz, David Edwin; Issue Notification for U.S. Appl. No. 13/339,655, filed Dec. 29, 2011, dated Sep. 17, 2014, 1 pg.

Splitz, David Edwin; Non-Final Office Action for U.S. Appl. No. 13/339,655, filed Dec. 29, 2011, dated Mar. 5, 2014, 18 pgs.

Splitz, David Edwin; Non-Final Office Action for U.S. Appl. No. 13/339,655, filed Dec. 29, 2011, dated Sep. 16, 2013, 57 pgs.

Splitz, David Edwin; Notice of Allowance for U.S. Appl. No. 13/339,655, filed Dec. 29, 2011, dated May 23, 2014, 41 pgs.

Splitz, David Edwin; Final Office Action for U.S. Appl. No. 14/490,081, filed Sep. 18, 2014, dated Jan. 11, 2017; 23 pgs.

Splitz, David Edwin; Issue Notification for U.S. Appl. No. 14/490,081, filed Sep. 19, 2014, dated Jul. 11, 2018, 1 pg.

Splitz, David Edwin; Non-Final Office Action for U.S. Appl. No. 14/490,081, filed Sep. 18, 2014, dated Sep. 29, 2016; 34 pgs.

Splitz, David Edwin; Notice of Allowance for U.S. Appl. No. 14/490,081, filed Sep. 18, 2014, dated Mar. 2, 2018, 26 pgs.

Dukes, Brent; Issue Notification for U.S. Appl. No. 14/475,050, filed Sep. 2, 2014, dated Jan. 18, 2017, 1 pg.

Dukes, Brent; Non-Final Office Action for U.S. Appl. No. 14/475,050, filed Sep. 2, 2014, dated May 19, 2016, 119 pgs.

Dukes, Brent; Notice of Allowability for U.S. Appl. No. 14/475,050, filed Sep. 2, 2014, dated Nov. 21, 2016, 33 pgs.

Dukes, Brent; Notice of Allowability for U.S. Appl. No. 14/475,050, filed Sep. 2, 2014, dated Dec. 15, 2016, 6 pgs.

Dukes, Brent; Notice of Allowance for U.S. Appl. No. 14/475,050, filed Sep. 2, 2014, dated Oct. 21, 2016, 15 pgs.

Cullinan, Thomas; Final Office Action for U.S. Appl. No. 15/098,986, filed Apr. 14, 2016, dated Jan. 25, 2018, 22 pgs.

Cullinan, Thomas; Non-Final Office Action for U.S. Appl. No. 15/098,986, filed Apr. 14, 2016, dated Apr. 5, 2018, 11 pgs.

Cullinan, Thomas; Non-Final Office Action for U.S. Appl. No. 15/098,986, filed Apr. 14, 2016; dated Jul. 12, 2017; 23 pgs.

Grady, Robert Henry; Corrected Notice of Allowance for U.S. Appl. No. 15/065,423, filed Aug. 9, 2016, dated Aug. 9, 2018, 6 pgs.

Grady, Robert Henry; Non-Final Office Action for U.S. Appl. No. 15/065,423, filed Mar. 9, 2016, dated Nov. 28, 2017, 45 pgs.

Grady, Robert Henry; Notice of Allowance for U.S. Appl. No. 15/065,423, filed Mar. 9, 2016, dated Apr. 12, 2018, 15 pgs.

Splitz, David; International Preliminary Report on Patentability for serial No. PCT/US11/58260, filed Oct. 28, 2011, dated May 8, 2014, 7 pgs.

Splitz, David; International Search Report and Written Opinion for serial No. PCT/US11/58260, filed Oct. 28, 2011, dated Feb. 7, 2012, 8 pgs.

Splitz, David Edwin; Office Action for Canadian application No. 2,861,675, filed Mar. 25, 2014, dated Apr. 12, 2018, 4 pgs.

Splitz, David Edwin; Office Action for Canadian Patent Application No. 2,861,675, filed Oct. 28, 2011, dated Aug. 22, 2017, 4 pgs.

Splitz, David; International Preliminary Report on Patentability for serial No. PCT/US12/22060, filed Jan. 20, 2012, dated May 8, 2014, 6 pgs.

Splitz, David; International Search Report and Written Opinion for serial No. PCT/US12/22060, filed Jan. 20, 2012, dated Mar. 29, 2012, 8 pgs.

Splitz, David Edwin; Office Action for Canadian patent application No. 2,850,059, filed Mar. 25, 2014, dated Oct. 31, 2017, 3 pgs.

Splitz, David Edwin; Office Action for Canadian patent application No. 2,850,059, filed Mar. 25, 2014, dated Apr. 23, 2018, 3 pgs.

Splitz, David Edwin; Extended European Search Report for serial No. 12844451.0, filed Jan. 20, 2012, dated Jan. 21, 2015, 8 pgs.

Dukes, Brent; International Preliminary Report on Patentability for PCT application No. PCT/US15/44140, filed Mar. 7, 2015, dated Mar. 16, 2017, 12 pgs.

Dukes, Brent; International Search Report and Written Opinion for application No. PCT/US15/44140, filed Aug. 7, 2015, dated Dec. 30, 2015, 15 pgs.

Splitz, David Edwin; U.S. Provisional Patent Application entitled: Automatic Discovery of Nodes in a Mesh Network, U.S. Appl. No. 61/779,896, filed Mar. 13, 2013; 110 pgs. (Copy not required—see MPEP § 609.04(a) (citing "Waiver of the Copy Requirement").).

Berg et al., Spread Spectrum in Mobile Communication, 1998, The Institution of Electrical Engineers, ISBN 085296935X, pp. 42-132 (Year 1998).

Splitz, David Edwin; Final Office Action for U.S. Appl. No. 15/206,851, filed Jul. 11, 2016, dated Jul. 20, 2018, 25 pgs.

Splitz, David Edwin; Non-Final Office Action for U.S. Appl. No. 15/206,851, filed Jul. 11, 2016, dated Feb. 7, 2018, 53 pgs.

(56) References Cited

OTHER PUBLICATIONS

Splitz, David Edwin; Final Office Action for U.S. Appl. No. 15/161,448, filed May 23, 2016, dated Mar. 15, 2018, 16 pgs.
Splitz, David Edwin; Notice of Allowance for U.S. Appl. No. 15/161,448, filed May 23, 2016, dated May 23, 2018, 16 pgs.
Splitz, David Edwin; Non-Final Office Action for U.S. Appl. No. 15/583,263, filed May 1, 2017, dated Mar. 8, 2018, 51 pgs.
Splitz, David Edwin; Corrected Notice of Allowability for U.S. Appl. No. 14/490,081, filed Sep. 18, 2014, dated Jun. 26, 2018, 8 pgs.
Splitz, David Edwin; International Search Report for PCT Application No. PCT/US2017/050393, filed Sep. 7, 2017, dated Jan. 8, 2018, 14 pgs.
Godwin, Angela; Article entitled: "Advanced Metering Infrastructure: Drivers and Benefits in the Water Industry", Waterworld, accessed on Mar. 30, 2016, 7 pgs.
Itron; Brochure for ChoiceConnect, Copyright 2013, 4 pgs.
Itron; Brochure for Radio Frequency Strategy in an AMI Deployment, Copyright 2012, 5 pgs.
Grady, Robert Henry; Issue Notification for U.S. Appl. No. 15/065,423, filed Mar. 9, 2016, dated Mar. 21, 2018, 1 pg.
Cullinan; Thomas; Notice of Allowance for U.S. Appl. No. 15/098,986, filed Apr. 14, 2016, dated Sep. 18, 2019, 16 pgs.
Splitz, David Edwin; Non-Final Office Action for U.S. Appl. No. 16/214,489, filed Dec. 10, 2018, dated Jul. 25, 2019, 56 pgs.
Splitz, David Edwin; Non-Final Office Action for U.S. Appl. No. 16/111,325, filed Aug. 24, 2018, dated Aug. 15, 2019, 45 pgs.
Magley, Dale McLeod; Non-Final Office Action for U.S. Appl. No. 16/149,242, filed Oct. 2, 2018, dated Aug. 7, 2019, 46 pgs.
Cullinan, Thomas; Corrected Notice of Allowance for U.S. Appl. No. 15/098,986, filed Apr. 14, 2016, dated Nov. 22, 2019, 10 pgs.
Cullinan, Thomas; Supplemental Notice of Allowance for U.S. Appl. No. 15/098,986, filed Apr. 14, 2016, dated Oct. 25, 2019, 7 pgs.
Splitz, David Edwin; Office Action for Canadian application No. 2,850,059, filed Jan. 20, 2012, dated Nov. 5, 2019, 3 pgs.
Splitz, David Edwin; Final Office Action for U.S. Appl. No. 16/214,489, filed Dec. 10, 2018, dated Nov. 5, 2019, 40 pgs.
Splitz, David Edwin; International Preliminary Report on Patentability for PCT Application No. PCT/US2017/050393, filed Sep. 7, 2017, dated Nov. 14, 2019, 11 pgs.
Splitz, David Edwin; Notice of Allowance for U.S. Appl. No. 16/214,489, filed Dec. 10, 2018, dated Jan. 15, 2020, 11 pgs.
Splitz, David Edwin; Notice of Allowance for U.S. Appl. No. 16/11,325, filed Aug. 24, 2018, dated Dec. 26, 2019, 12 pgs.
Magley, Dale McLeod; Final Office Action for U.S. Appl. No. 16/149,242, filed Oct. 2, 2018, dated Dec. 16, 2019, 38 pgs.

* cited by examiner

TIME BEACONS

CROSS-REFERENCE

This application is a continuation of U.S. patent application Ser. No. 15/065,423 filed Mar. 9, 2016, which is incorporated herein by this reference in its entirety.

BACKGROUND

A utility provider, such as a gas, electricity, or water provider, may have a large number of control, measuring, and sensing devices installed in the field in order to control transmission and distribution of the product, measure, and record product usage, and detect problems. Such devices may include water, gas, or electrical meters, remotely controlled valves, flow sensors, leak detection devices, and the like. The utility provider may utilize various networking technologies, including wired, RF, cellular, Wi-fi, and the like to control remote devices and collect and analyze utility data from a central location. Such systems may be referred to as Advanced Metering Infrastructure ("AMI") or Advanced Metering Management ("AMM") systems.

In a typical configuration, an AMI system may comprise a central host capable of connecting via wired and/or wireless networking infrastructures to a number of communication nodes, each node providing network communications for one or more connected metering devices, control devices, sensor devices, or the like. The AMI system may further include data collection hubs, repeaters, gateways, and the like. For example, the network topology of the AMI system be configured in a hybrid-star configuration where intermediary collection hubs communicate directly with the host and with assigned child nodes supported by repeaters and/or "buddy nodes" in the topology.

For some functions, having accurate time synchronization between the various nodes and/or between the nodes and the host may be essential. For example, a water provider may implement a leak detection or condition assessment system on a host that collects acoustic data recorded by acoustic sensors at two or more geographically remote locations and analyzes the acoustic data to detect leaks in the transmission/distribution system and/or determine the integrity of pipe walls. The leak detection or condition assessment system may utilize correlation analysis between the recorded acoustic data from the various locations to detect the presence of a leak or other anomaly and determine its location. However, in order to accurately determine the location of the leak, it is necessary for the acoustic data to be recorded by the leak detection devices at substantially the same time. For example, the timing of the two or more acoustic recordings must be within 15 milliseconds in order for the correlation analysis to identify the location of a leak in a pipe within ±50 ft.

It is with respect to these and other considerations that the disclosure made herein is presented.

BRIEF SUMMARY

The present disclosure relates to technologies for time-synchronizing multiple remote network nodes concurrently with time beacons. According to some embodiments, a hub device, at a preconfigured start time, begins to periodically broadcast time beacons containing current time values retrieved from an accurate time source over a beacon period, while nodes, at the same preconfigured start time, start listening for time beacons. When a node receives a time beacon broadcast by the hub device, the node sets a real-time clock of the node to the current time value in the received time beacon.

According to further embodiments, a system comprises a collection hub and a child node in an advanced metering infrastructure ("AMI") network. The collection hub is connected to an accurate time source and configured with a start time, a beacon period, and a node ID. The collection hub is further configured to determine one or more beacon channels on which to broadcast time beacons based on its node ID. At the configured start time, the collection hub determines a random time within a first delay period to start broadcasting the time beacons, and after waiting the random time, repeatedly broadcast time beacons on the one or more beacon channels over the beacon period. Each time beacon contains a current time value retrieved from the accurate time source. The child node is configured with the start time and the node ID of the collection hub. The child node is further configured to determine the one or more beacon channels to which to listen based on the node ID of the collection hub. At the configured start time, the child node listens for time beacons on the one or more beacon channels, and upon receiving a time beacon broadcast by the collection hub, sets a real-time clock of the child node to the current time value in the received time beacon.

According to further embodiments, a computer-readable storage medium comprises processor-executable instructions that, when executed by a processor in a node of an advanced metering infrastructure ("AMI") system configured as a collection hub, cause the processor to determine one or more beacon channels on which to broadcast time beacons based on a node ID of the collection hub and, at a preconfigured start time, determine a random time within a first delay period to start broadcasting the time beacons. After waiting the random time, the collection hub repeatedly broadcasts time beacons on the one or more beacon channels over a beacon period, each time beacon containing a current time value retrieved from an accurate time source connected to the collection hub.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for time-synchronizing multiple remote network nodes concurrently with time beacons. As discussed above, various nodes in an AMI or other network system may require time synchronization. For example, leak detection devices used to record acoustic data for leak detection require highly accurate time synchronization to support the required correlation analysis. However, many nodes in a typical AMI system may be battery powered and designed for low-power operational modes and communication such that the installed device can operate for many years. These devices normally do not contain highly accurate real-time clocks or a direct connection to a highly accurate time source.

In some systems, the time on an individual node may be set by sending a discrete message containing a time value to the node from a host or an intermediary hub device connected to an accurate time source, such as a GPS receiver, a cellular communication module, or the like. This may be performed at a time just before a leak detection device is scheduled to record acoustic data in order to account for real-time clock drift in the individual node/device. However, such a time synchronization scheme is not scalable to AMI systems containing potentially thousands of nodes because the time required for the host or hub to send 1000 or more time synchronization messages may be far too long to be feasible.

Utilizing the embodiments herein, time synchronization across multiple, independent nodes can be accomplished concurrently and efficiently with a minimal number of broadcast messages, referred to herein as "time beacons." According to some embodiments, a network node with a connection to an accurate time source, such as a collection hub, is programmed to periodically broadcast time beacons with current time data over a beacon period. Remote nodes are similarly programmed to periodically wake-up from low-powered states and listen for time beacons from their assigned collection hub and synchronize their internal real-time clocks from the current time data. Some remote nodes, such as repeaters or "buddy-nodes," may be further programmed to rebroadcast time beacons for the remainder of the beacon period in order to ensure that time beacons reach all remote nodes in the network.

Figure 1:
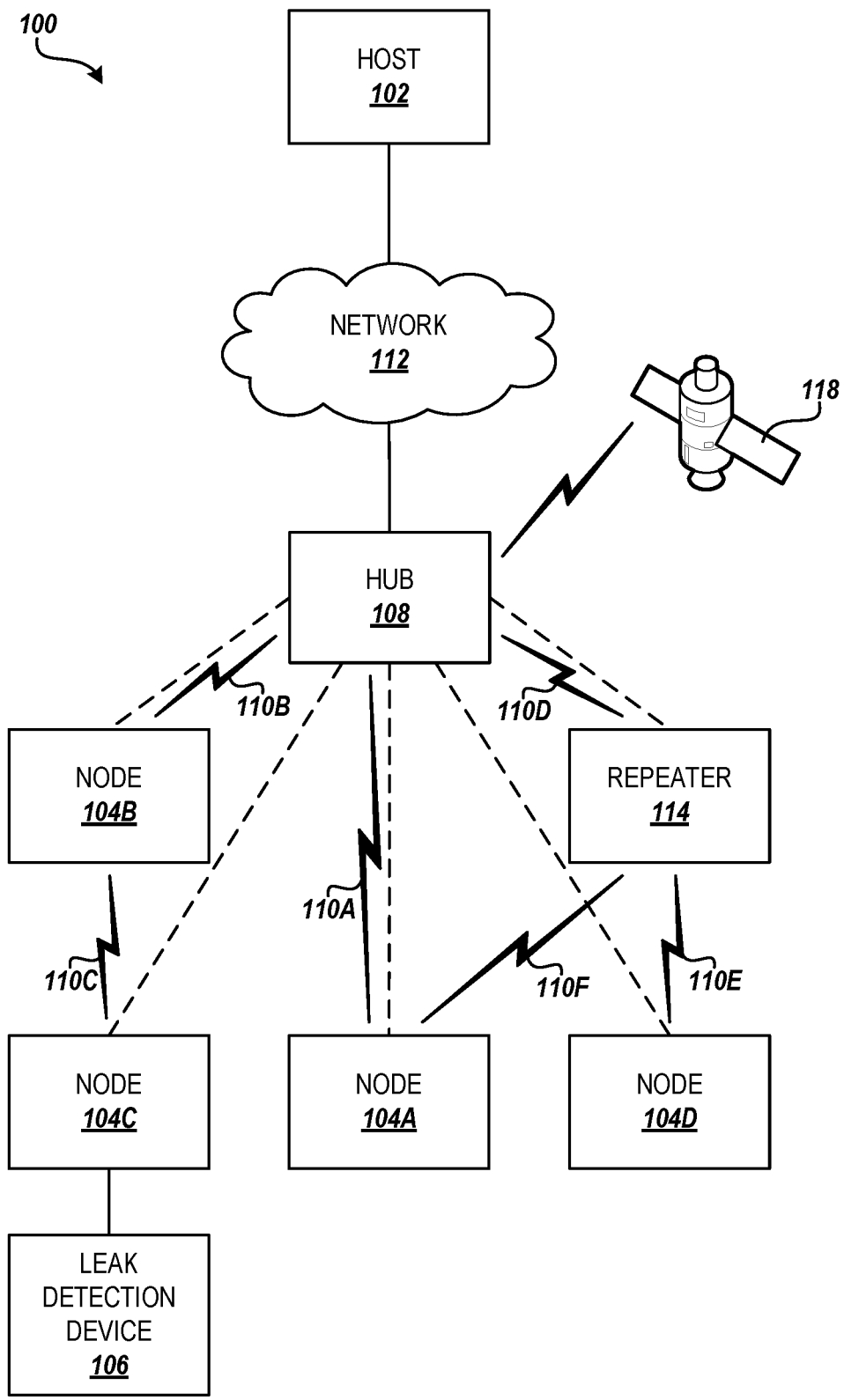
FIG. 1 is a block diagram showing one example of a network topology of an AMI system, according to embodiments described herein.

FIG. 1 is a block diagram showing one example of a network topology of an illustrative AMI system 100, such as that implemented by a utility provider. The AMI system 100 may include utility provider systems, such as host 102. The host 102 may represent a combination of application servers, database servers, communication servers, web servers, and the like that comprise the systems of the utility provider used to collect data from, control, and manage the various communication nodes 104A-104D (referred to herein generally as nodes 104) in the AMI system 100. Nodes 104 may be connected to water, gas, or electrical meters, remotely controlled valves, flow sensors, leak detection devices, and the like. It will be appreciated that the term "node" as used herein may refer to either a composite device in the AMI system 100 capable of performing a specific function or a communication module connected to such a device and configured to provide communications for the device with other nodes 104 and/or the host 102. For example, as shown in FIG. 1, node 104C may be connected to leak detection device 106 and provide AMI network communication for the device.

According to embodiments, the host 102 may communicate with the nodes 104 through one or more collection hubs 108. The collection hubs 108 may comprise specialized network nodes installed in the field that act as a "parent node" for a set of assigned child nodes 104A-104D that communicate with the hub through various communication links 110A-110E (referred to herein generally as communication links 110). The communication links 110 may include wireless communication links, such as radio frequency ("RF") communication links. The collection hubs 108 may periodically collect usage data, sensor data, and other data from the child nodes 104 and forward data to the host 102 over a network 112. The collection hubs 108 may also forward messages received from the host 102 over the network 112 to the target child node(s) 104. The network 112 may comprise various networking technologies that connect the collection hubs 108 in the field to the host 102, including cellular data networks, Wi-fi or WiMAX networks, satellite communication networks, metropolitan-area networks ("MANs"), wide-area networks ("WANs"), the Internet, and the like.

A collection hub 108 may communicate with its child nodes 104A-104D either directly or through one or more intermediary devices. For example, the AMI system 100 may include repeaters 114 that facilitate communication between the collection hub 108 and remote nodes, such as node 104D. According to further embodiments, some nodes may be configured to act as repeaters, referred to herein as "buddy nodes," such as node 104B shown in FIG. 1. It will be appreciated that some nodes in the AMI system 100, such as node 104A, may be located such that it receives messages from the collection hub 108 both directly and by way of one or more repeaters 114 or buddy nodes.

In some embodiments, the nodes 104 of the AMI system 100 may employ frequency-hopping spread spectrum ("FHSS") technology to transmit and receive data over the wireless communication links 110. FHSS is a method of transmitting and receiving radio signals by rapidly switching among many frequency channels using a pseudorandom channel sequence known to both the transmitting and receiving devices. In order to increase battery life while increasing data transmission reliability and reducing system response times, each of the nodes 104 may operate in one of 3 states: a SLEEP state used to conserve battery life; a SLAVE state used for responding to and receiving data from a MASTER state device; and a MASTER state used to initiate communications with (i.e., "hail") and send data to a SLAVE state device.

In the SLEEP state, a node 104 may periodically waken and briefly listen for a "hailing" signal on one or more hailing channels from another device in MASTER state. The SLEEP state device may choose hailing channels from a predefined pseudorandom hailing channel frequency set based upon the network ID of the device (also referred to herein as "node ID"), the system time, the network ID of the assigned parent node (e.g. collection hub 108), and/or other information. If the device in SLEEP state fails to detect a hailing signal, the device returns to the SLEEP state. If the SLEEP state device detects a hailing signal, it fully awakens and begins listening for data messages from the MASTER state device on a predefined data channel selected from a predefined pseudorandom data channel frequency set as indicated by the MASTER state device. In other words, the SLEEP state device exits the SLEEP state and enters the SLAVE state.

In some embodiments, hailing channels and data channels are selected from the 902-928 MHz industrial, scientific, and medical ("ISM") bandwidth. For example, one hundred (100) channels may be chosen with a minimum channel spacing of 100 kHz each. Fifty (50) of the channels may be randomly assigned to the pseudorandom data channel frequency set, and fifty (50) different channels randomly assigned to the hailing channel frequency set. The set of fifty (50) hailing channels are used by nodes 104 during the MASTER and SLEEP states to send and receive hailing requests while the set of fifty (50) data channels are used by nodes during the MASTER and SLAVE states to send and receive data messages. According to some embodiments, the hailing channels may further be used for transmitting time beacons, as will be described below.

A non-limiting, exemplary set of 50 hailing channels (from hailing channel 0 to hailing channel 49) is shown below in Table 1. In some embodiments, these hailing channels may be grouped into hailing channel groups. For example, hailing channel group 0 may include hailing channels 0 and 1 (908.15 MHz and 919.8 MHz), while hailing channel group 1 may include hailing channels 2 and 3 (922.65 MHz and 902.65 MHz), continuing through hailing channel group 24. More generally, hailing channel group "n" may include hailing channel "x" and hailing channel "x+1" where "x" represents a hailing channel. In other embodiments, hailing channel groups may include a different number or combination of hailing channels.

TABLE 1

Hailing Channel Frequency Set

| Ch. | Freq. | Ch. | Freq. | Ch. | Freq. | Ch. | Freq. |
| --- | --- | --- | --- | --- | --- | --- | --- |
| 0 | 926.8 MHz | 1 | 922.96 MHz | 2 | 925.48 MHz | 3 | 922.72 MHz |
| 4 | 922 MHz | 5 | 925.96 MHz | 6 | 922.84 MHz | 7 | 922.48 MHz |
| 8 | 923.32 MHz | 9 | 925 MHz | 10 | 923.2 MHz | 11 | 924.52 MHz |
| 12 | 925.12 MHz | 13 | 922.6 MHz | 14 | 923.68 MHz | 15 | 925.36 MHz |
| 16 | 924.16 MHz | 17 | 927.76 MHz | 18 | 927.88 MHz | 19 | 927.4 MHz |
| 20 | 924.76 MHz | 21 | 924.28 MHz | 22 | 926.92 MHz | 23 | 926.44 MHz |
| 24 | 927.16 MHz | 25 | 922.63 MHz | 26 | 924.04 MHz | 27 | 923.92 MHz |
| 28 | 923.56 MHz | 29 | 923.08 MHz | 30 | 922.24 MHz | 31 | 927.28 MHz |
| 32 | 926.2 MHz | 33 | 926.08 MHz | 34 | 923.8 MHz | 35 | 924.88 MHz |
| 36 | 925.24 MHz | 37 | 925.84 MHz | 38 | 923.44 MHz | 39 | 927.52 MHz |
| 40 | 922.12 MHz | 41 | 926.56 MHz | 42 | 924.64 MHz | 43 | 927.64 MHz |
| 44 | 924.4 MHz | 45 | 927.04 MHz | 46 | 926.68 MHz | 47 | 925.72 MHz |
| 48 | 926.32 MHz | 49 | 925.6 MHz | | | | |

In some embodiments, a particular device selects an initial subset of two (2) consecutive channels (i.e., a channel group) from its predefined pseudorandom hailing channel frequency set to be used while in the SLEEP state by first calculating a channel offset based on its node ID. This offset is added to a hailing channel pointer. The hailing channel pointer points to one of the fifty (50) available hailing channels, and increments to the next set of two (2) channels every, for example, 18 seconds so that each device will continuously "hop" through all of the fifty (50) available hailing channels at a system hopping rate. In this manner, hailing channel usage is spread across the predefined hailing channel. In some embodiments, the hailing channel usage may be substantially equal manner such that each channel within the hailing channel frequency set is used for substantially the same amount of time or for substantially the same number of times. In further embodiments, the hailing channel usage might be skewed to use hailing channels with less interference more frequently while using hailing channels with more interference less frequently. When sending and receiving data messages in MASTER and SLAVE states, the device may similarly hop through the data channel frequency set to assure that, on average, all data channels are used equally.

According to embodiments, the collection hubs 108 may include or be connected to an accurate time source 118. For example, a collection hub 108 may be GPS-enabled and able to receive a highly accurate time value from a GPS receiver. Other accurate time sources 118 may include a cellular network connection, an integrated accurate real-time clock component, and the like. Because collection hubs 108 may be connected to fixed power sources, these devices may be able to maintain accurate current time without the need for reduced power consumption required by other, remote nodes 104. It will be appreciated that the configuration of the network comprising the AMI system shown in FIG. 1 and described above is merely one configuration, and additional devices and/or alternative configurations may be conceived by one skilled in the art. As such, the network topology shown in FIG. 1 and the network configurations described should not be seen as limiting but, instead, as merely exemplary.

Figure 2:
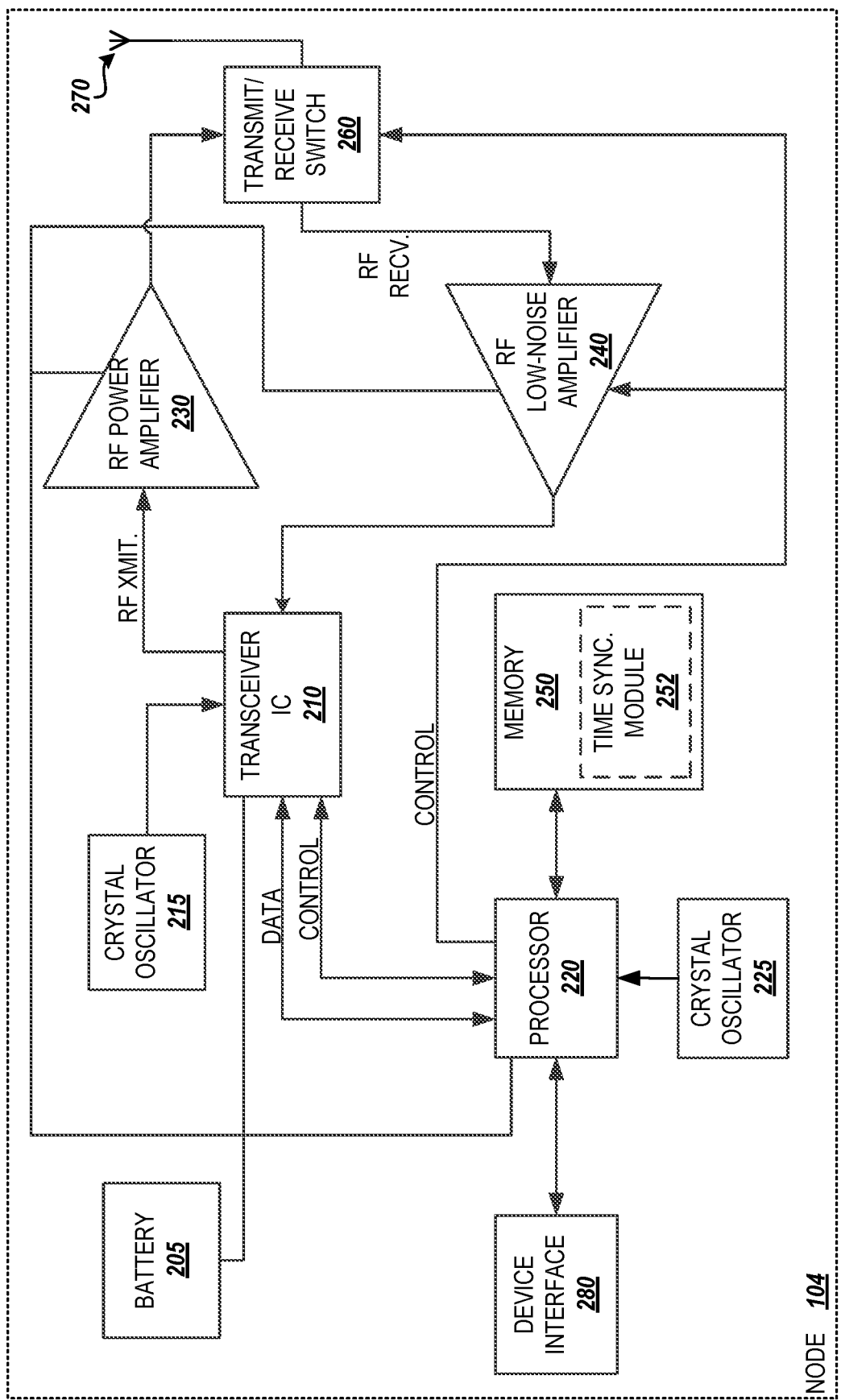
FIG. 2 is a block diagram of an RF communication component or node in the AMI system, according to embodiments described herein.

FIG. 2 shows a block diagram of components of an illustrative node 104 configured for RF communication in AMI network. The node 104 may allow devices in the AMI system 100, such as water, gas, or electrical meters, remotely controlled valves, flow sensors, leak detection devices, collection hubs 108, repeaters 114, and the like, to communicate with one another over the wireless AMI network. For example the node 104 may be implemented in or connected to a leak detection device 106 in order to transmit audio recording data to the host 102 for leak detection, as described above in regard to FIG. 1. According to embodiments, the node 104 may be configured for communication on various radio network topologies, including star, hybrid-star, peer-to-peer, mesh, and the like.

The node 104 may include a battery 205 that powers a transceiver integrated circuit ("IC") 210, a processor 220, an RF power amplifier 230, an RF low-noise amplifier 240, a memory 250, and other components. Crystal oscillators 215 and 225 are connected to the transceiver IC 210 and the processor 220, respectively. The node 104 further includes a transmit/receive switch 260 and antenna 270. The processor 220 may be a microprocessor, a microcontroller, a field-programmable gate array ("FPGA"), or the like. The processor 220 and the transceiver IC 210 may include both a two-way data and a two-way control line. In some embodiments, the processor 220 includes a control line to each of the RF low-noise amplifier 240 and the transmit/receive switch 260. The processor 220 may also be connected to the memory 250 by a two-way data line.

The memory 250 may comprise a computer-readable storage medium for storing processor-executable instructions, data structures and other information. The memory 250 may include a non-volatile memory, such as read-only memory ("ROM") and/or FLASH memory, and a random-access memory ("RAM"), such as dynamic random access memory ("DRAM") or synchronous dynamic random access memory ("SDRAM"). The memory 250 may store a firmware that comprises commands and data necessary for the nodes 104, collection hubs 108, and repeaters 114 to communicate with other devices in the AMI system 100 as well as perform other operations of the nodes. According to some embodiments, the memory 250 may store a time synchronization module 252 comprising processor-executable instructions that, when executed by the processor 220, perform portions of the routines 500, 600, and 700 for time-synchronizing multiple remote network nodes concurrently with time beacons, as described herein.

In addition to the memory 250, the node 104 may have access to other computer-readable media storing program modules, data structures, and other data described herein for time-synchronizing multiple remote network nodes concurrently with time beacons. It will be appreciated by those skilled in the art that computer-readable media can be any available media that may be accessed by the processor 220 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

According to embodiments, the processor 220 may be further connected to other components of the node 104 through a device interface 280. In some embodiments, the device interface 280 may connect to a metering component, such as a water, gas, or electricity meter, that allows the meter to provide usage data to the host 102 through the AMI system 100. In further embodiments, the device interface 280 may connect to sensors or detection components, such as the leak detection device 106 described above. In still further embodiments, the device interface 280 may connect to a control component, such as an electronically actuated water valve, that allows the host 102 and/or other devices in the AMI system 100 to control aspects of the utility provider's infrastructure. These examples are not meant to be limiting, and those of skill in the art will recognize that alternative device components that may be interfaced with the node 104 through the device interface 280.

It will be appreciated that the structure and/or functionality of the node 104 may be different than that illustrated in FIG. 2 and described herein. For example, the transceiver IC 210, processor 220, RF power amplifier 230, RF low-noise amplifier 240, memory 250, crystal oscillators 215, 225, device interface 280 and other components and circuitry of the node 104 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the node 104 may not include all of the components shown in FIG. 2, may include other components that are not explicitly shown in FIG. 2 or may utilize an architecture completely different than that shown in FIG. 2.

Figure 3:
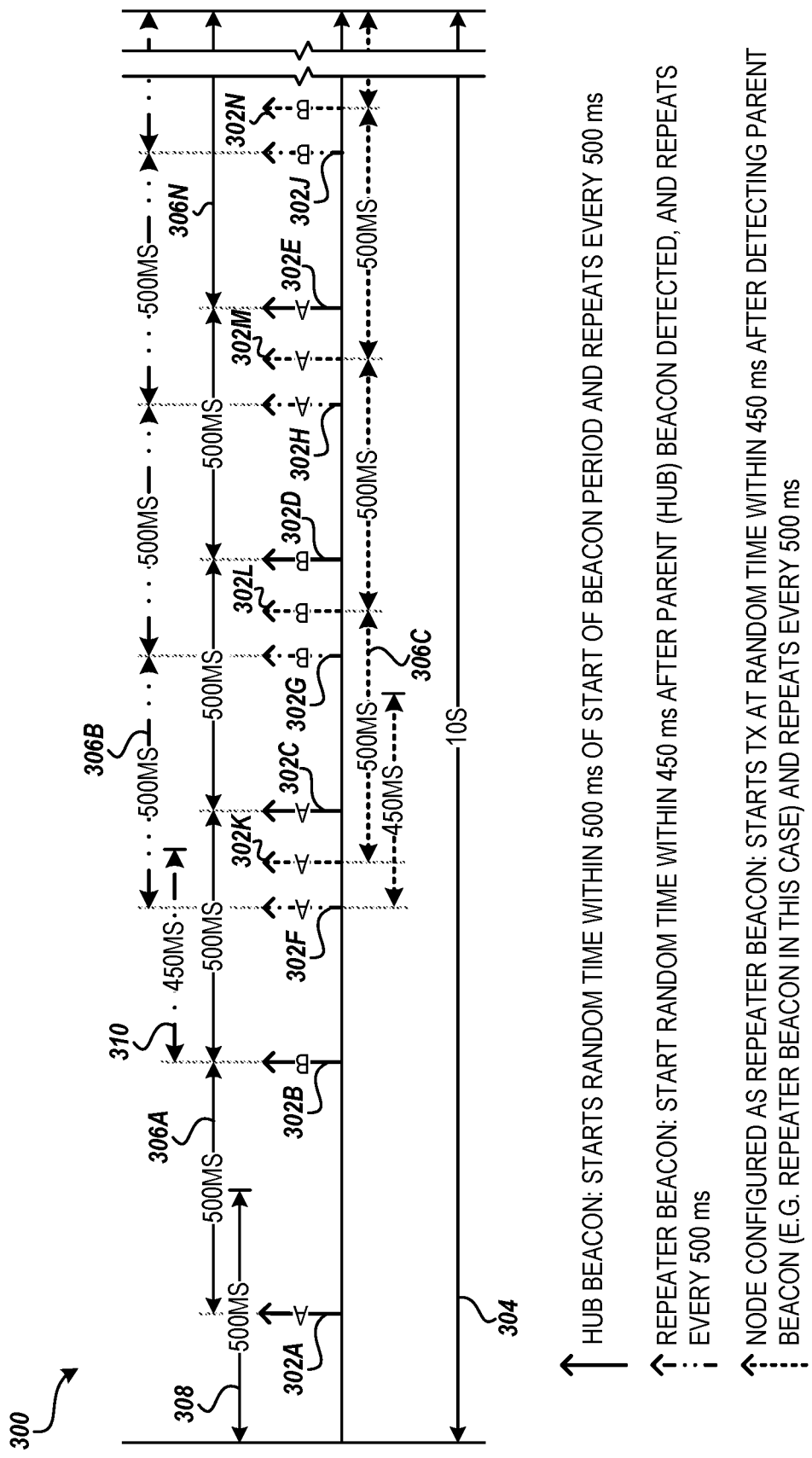
FIG. 3 is a timing diagram showing example timing of time beacon messaging among a hub, a repeater, and a node in the AMI system, according to embodiments described herein.

FIG. 3 provides additional details regarding the methods described herein for time-synchronizing multiple remote network nodes concurrently with time beacons. Specifically, FIG. 3 is a timing diagram 300 showing an illustrative sequence of time beacons 302A-302N (referred to herein generally as time beacons 302) transmitted by a collection hub 108, a repeater 114, and a node 104B configured as a buddy node, in an exemplary time-synchronization process. The time intervals shown in the timing diagram 300 are for illustration only and are not intended to be limiting.

According to some embodiments, each collection hub 108 in the AMI system 100 is configured to periodically perform the time-synchronization process by broadcasting time beacons 302 containing a current time value to its assigned child nodes 104 over a beacon period 304. In some embodiments, the collection hubs 108 may be configured with a specific time each day for performing the time synchronizing process. For example, a collection hub 108 with assigned child nodes 104 comprising leak detection devices 106 may be configured to perform the time synchronizing process a short time before the detection devices are set to begin recording acoustic data in order for the devices to have the most accurate current time possible for the recording process.

The beacon period 304 may be an arbitrary period over which the collection hub repeats transmission of the time beacons 302 to ensure that as many child nodes 104 as possible receive a current time value in the time beacon. For example, the beacon period 304 may comprise 10 seconds and be divided into 20 500 ms window periods 306A-306N (referred to herein generally as window period 306), with a time beacon 302 being broadcast by the collection hub within each window. According to some embodiments, the collection hubs 108 may broadcast the time beacons 302 over multiple communication channels (also referred to herein as "beacon channels") during the beacon period 304. For example, a collection hub 108 may select a pair of beacon channels from the predefined pseudorandom hailing channel frequency set described above in regard to FIG. 2 based on the node ID of the hub. In some embodiments, the collection hub 108 may select the pair of sequential channels using the formula:

$$BeaconChPairStart(CH\text{-}A \text{ and } CH\text{-}B) = (nodeID \% 25) \times 2$$

According to some embodiments, the collection hub 108 may be programmed to, at a configured start time, randomly pick a time within a 500 ms delay period 308 and broadcast a first time beacon 302A on the first beacon channel (CH-A) of the selected pair, as shown in FIG. 3. The time beacon 302A contains a current time value sourced from the integrated or connected accurate time source 118. The collection hub 108 will then wait the 500 ms window period 306A and transmit a second time beacon 302B on the second beacon channel (CH-B) containing an updated current time value. This pattern may then repeat every second for the 10 seconds beacon period 304, as further shown by time beacons 302C, 302D, and 302E in the timing diagram 300. In further embodiments, the selection of the alternating beacon channels for the repeating broadcast of time beacons 302A-302E may also be random. The randomness (timing randomness and/or channel randomness) produces jitter in the timing of the time beacons 302 in order to minimize collisions with other message from other similarly timed processes, such as the repeating of the time beacon messages by a repeater 114 or buddy node 104B, as described below.

According to embodiments, child nodes 104 of the collection hub 108 may be similarly configured to wake-up at the configured start time and listen for time beacons 302 on the selected beacon channels for the configured beacon period 304. In some embodiments, because the child nodes 104 are configured with the node ID of their parent collection hub 108, they may use the same or a similar formula described above for the hub to select the beacon channel(s) from the predefined pseudorandom hailing channel frequency set to which to listen. For example, as shown in a corresponding timing diagram in FIG. 4, a node 104 may listen for a first listening period 402A to a first beacon channel (CH-A) and then for a second listening period 402B to the second beacon channel (CH-B). In some embodiments, the listening periods 402A and 402B may comprise 1 second. The listening process may then be repeated until a time beacon 302 is detected.

Figure 4:
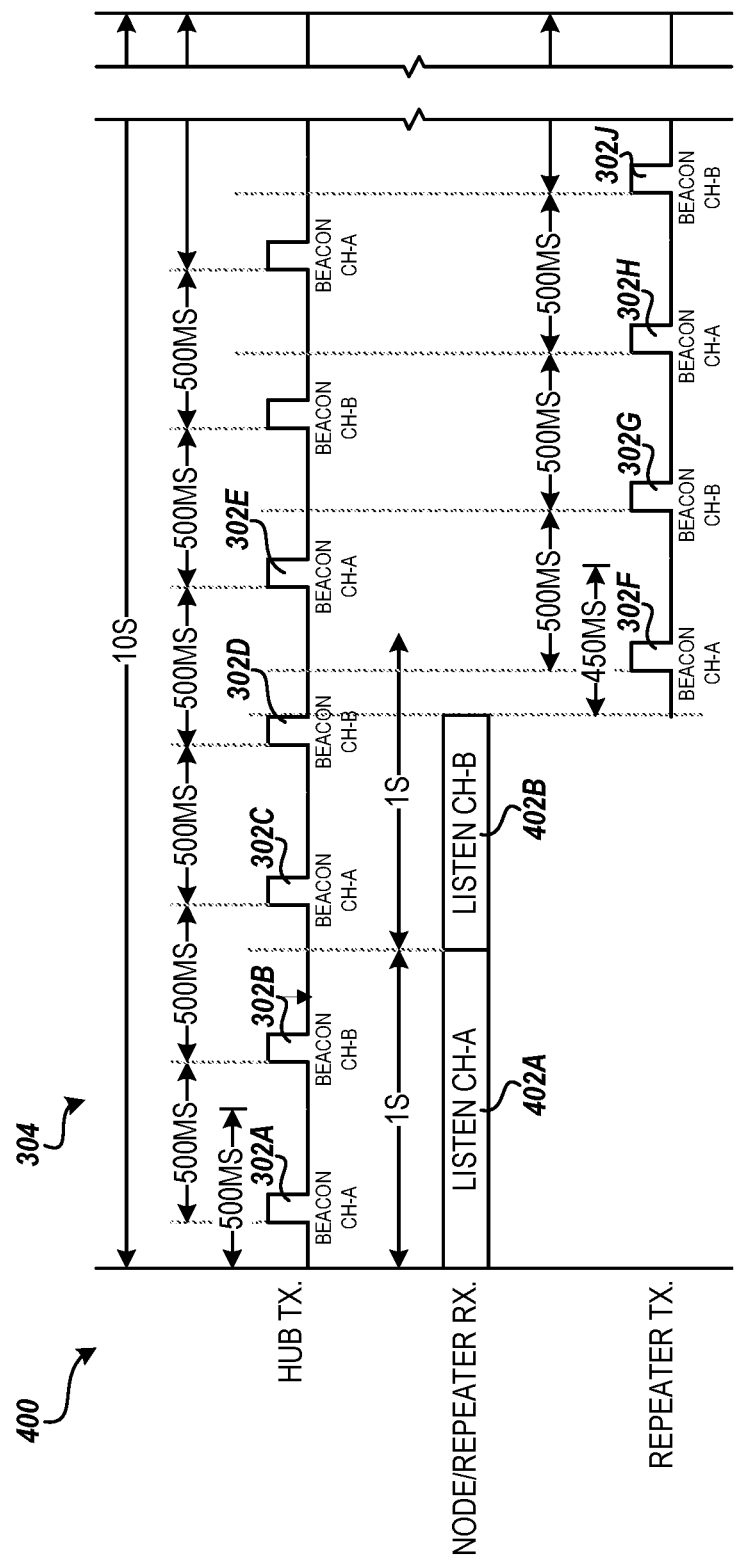
FIG. 4 is a timing diagram showing additional details of the timing of time beacon messaging in the AMI system, according to embodiments described herein.

Once a time beacon is detected, such as time beacon 302D in the example shown in the timing diagram 400 of FIG. 4, the node 104 may validate the beacon message set its real-time clock from the current time value specified in the message. The node 104 may then stop listening and return to a SLEEP or low-power state. In further embodiments, a child node 104 may remember the last beacon (hailing) channel from which it received a time beacon 302 and only listen for time beacons on that beacon channel in subsequent time synchronizing processes. In further embodiments, the child nodes 104 may scan all of the hailing channels in the predefined pseudorandom hailing channel frequency set listening for time beacons during the beacon period 304.

According to further embodiments, some nodes 104 in the AMI system 100 may be configured to rebroadcast time beacons 302 during the beacon period 304. For example, upon detecting a time beacon from a collection hub 108 or other parent node 104, repeaters 114 and buddy nodes 104B may be configured to set their real-time clocks from the current time value in the time beacon message and rebroadcast time beacons under a similar/same protocol as that described above for the collection hub 108 for the remainder of the beacon period 304.

As shown in FIG. 3, upon detecting a time beacon, such as time beacon 302B, and setting its own real-time clock from the current time value therein, the repeater 114 may be programmed to pick a random time within a 450 ms delay period 310 of receiving the time beacon and then broadcast a first time beacon 302F on the first beacon channel (CH-A) based on the node ID of repeater. In other embodiments, the repeater 114 may select the first beacon channel (CH-A) based on the node ID of its parent collection hub 108. The time beacon 302F will contain a current time value sourced from the real-time clock of the repeater 114. The repeater 114 will then wait the 500 ms window period 306B and transmit a second time beacon 302G on the second beacon channel (CH-B) containing an updated current time value from its real-time clock. This pattern may then repeat for the remainder of the beacon period 304, e.g. 10 seconds from the wake up time programmed for the repeater 114, as further shown by time beacons 302H and 302J in the timing diagram 300. The timing of the time beacons 302F-302J rebroadcast by a repeater 114 is further illustrated in FIG. 4, according to further embodiments.

Similarly, a node configured as a time beacon repeater or buddy node, such as node 104D, may be programmed to broadcast a similar pattern of time beacons 302K-302N on the alternating beacon channels CH-A and CH-B based on its own node ID over the remainder of the beacon period 304 after waiting a random period after detecting a time beacon message from the repeater 114, such as time beacon 302F, as further shown in FIG. 3.

It will be appreciated that a parent collection hub 108 and child nodes 104 and repeaters 114 may need to be programmed with a same start time for the time synchronization process, and that the various nodes may also be programmed whether to rebroadcast time beacons 302 when detected. To this end, the nodes 104, collection hubs, and repeaters 114 may be configured with special configuration APIs (e.g., a beacon-config message) for configuring the time synchronization process settings, such as a flag for enabling time beacon reception ("BeaconRX"), another flag for enabling time beacon rebroadcast ("BeaconTX"), the start time for the time synchronization process ("BeaconStartTime"), and the like. In further embodiments, an auto-configuration mode may be implemented in the firmware for the various nodes 104 that will automatically set the BeaconRX flag to enable for all repeaters 114 and for nodes 104 connected to leak detection devices 106 or other sensor devices requiring accurate timing. Similarly, the BeaconTX flag for may be automatically enabled for repeaters 114 and for any nodes 104 having children nodes detected.

Table 2 shows an illustrative data packet format of a time beacon 302, according to some embodiments. The time beacon packet may include a UTC time value ("UTC_Time") and a millisecond value ("MSec") indicating the current time value retrieved by the collection hub 108, repeater 114, or buddy node 104 from its accurate time source 118 or real-time clock. As discussed above, some nodes, such as node 104A shown in FIG. 1, may be located in such a manner as to time beacons 302 from both its assigned parent collection hub 108 and a repeater 114 or buddy node. It will be appreciated that time beacons 302A-302E received from a collection hub 108 or node connected to an accurate time source 118 will contain a more accurate current time value than time beacons 302F-302N received from an intermediary device, such as a repeater 114 or buddy node, due to transmission and processing latency involved in retrieving the current time value, transmission of the time beacon packet, and processing of the packet on the receiving node in order to set the real-time-clock from the current time value.

TABLE 2

| Time Beacon Packet | | | |
|---|---|---|---|
| Field | Offset | Bytes | Description |
| 0x99 | 0 | 1 | Packet Type: Beacon Time Notice Packet |
| <Dst> | 1 | 4 | Destination Address (Broadcast 0xFFFFFFFF) |
| <Src> | 5 | 4 | Source Address (Hub Node ID) |
| <ClkHopCnt> | 9 | 1 | The number of Hops this time has passed: 0 = 1$^{st}$ hop time passing (best time from a GPS-enabled Hub) 1-127 = Number of hops time has passed from a GPS-enabled Hub |

TABLE 2-continued

Time Beacon Packet

| Field | Offset | Bytes | Description |
|---|---|---|---|
| <UTC_Time> | 10 | 4 | 128-254 = Number of hops time has passed from a non-GPS-enabled Hub UTC time in seconds (value of 0 indicates time is not valid) |
| <MSec> | 14 | 2 | Milliseconds of UTC time |
| <CRC16> | 16 | 2 | CRC-16 for packet |

In order to indicate a relative accuracy of the current time value included in the time beacon 302, the time beacon packet may further include a clock-hop count value ("ClkHopCnt"). The ClkHopCnt may be set by the transmitting node of the time beacon 302 to indicate a source of the current time value as well as a relative number of clock hops between the original source node and the transmitting node. For example, a GPS-enabled collection hub 108 may set the ClkHopCnt in broadcasted time beacons 302A-302E to zero (0x00) indicating that the hub is GPS-locked and the current time value is of the highest value. If the collection hub 108 is not GPS-locked when the current time value is retrieved, then the hub may set the ClkHopCnt value to 128 (0x80) to indicate the clock is not sourced from GPS. This may adequate in some cases where all nodes 104 connected to leak detection devices 106 recording acoustic data for correlation processed are synchronizing time with a same collection hub 108, for example.

When time beacons 302 are rebroadcast from a repeater 114 or buddy node 104, the ClkHopCnt value contained therein may be incremented to indicate an additional clock hop (and thus a relative degradation in the accuracy of the current time value). For example, as shown in FIG. 3, the time beacons 302F-302J broadcast by the repeater 114 may contain a ClkHopCnt value of 1 (0x01), while the ClkHopCnt value in time beacons 302K-302N broadcast by the buddy node may be set to 2 (0x02). According to some embodiments, when a node 104 receives a time beacon 302 during the time synchronization process with a ClkHopCnt value greater than 0, the node may set its real-time clock with the current time value contained therein, but continue to listen through the remainder of the beacon period 304 for a time beacon containing a ClkHopCnt indicating a more accurate time source.

Alternatively or additionally, nodes 104 may retain the ClkHopCnt value from the time beacon 302 from which their real-time clock was set along with a timestamp value indicating when the time beacon was received. The host 102 may retrieve this information from the node 104 at a later time to evaluate the quality of the data received from the node 104. For example, if recorded acoustic data is received from a node connected to a leak detection device 106, such as node 104C, accompanied by status information indicating a last time synchronization of older than 30 minutes and/or a ClkHopCnt value>0, then the data may be suspect and may not be used in correlation analysis for leak detection or may be adjusted accordingly to account for potential inaccuracy in the real-time clock of the node.

In further embodiments, the time beacon methodology may be expanded to enable additional features. For example, a different data packet formats of time beacons messages may be transmitted during the programmed time for the time synchronization process in order to perform additional or alternative functions, such as setting a time for child nodes 104 to listen for a firmware update ("RFU broadcast") from the parent collection hub 108. Table 3 shows an illustrative data packet format of a time beacon 302 that includes both the time beacon fields and additional fields to enable the RFU broadcast. Other information, functions, and data packet formats for the time beacons 302 may be imagined by one skilled in the art upon reading this disclosure, and it is intended that all such information, functions, and packet formats be included in this application.

TABLE 3

Beacon RFU Packet

| Field | Offset | Bytes | Description |
|---|---|---|---|
| 0x9A | 0 | 1 | Packet Type: Beacon RFU Notice Packet |
| <Dst> | 1 | 4 | Destination Address (Broadcast 0xFFFFFFFF) |
| <Src> | 5 | 4 | Source Address (Hub Node ID) |
| <ClkHopCnt> | 9 | 1 | The number of Hops this time has passed: 0 = 1$^{st}$ hop time passing (best time from a GPS-enabled Hub) 1-127 = Number of hops time has passed from a GPS-enabled Hub 128-254 = Number of hops time has passed from a non-GPS-enabled Hub |
| <UTC_Time> | 10 | 4 | UTC time in seconds (value of 0 indicates time is not valid) |
| <MSec> | 14 | 2 | Milliseconds of UTC time |
| <RFUStartTime> | 16 | 4 | Start time for RFU broadcast in UTC seconds |
| <FWMajorVer> | 20 | 1 | Major version number |
| <FWMinorVer> | 21 | 1 | Minor version number |
| <FWBuildNum> | 22 | 1 | Build number |
| <CRC16> | 23 | 2 | CRC-16 for packet |

Figures 5A, 5B, 5C:
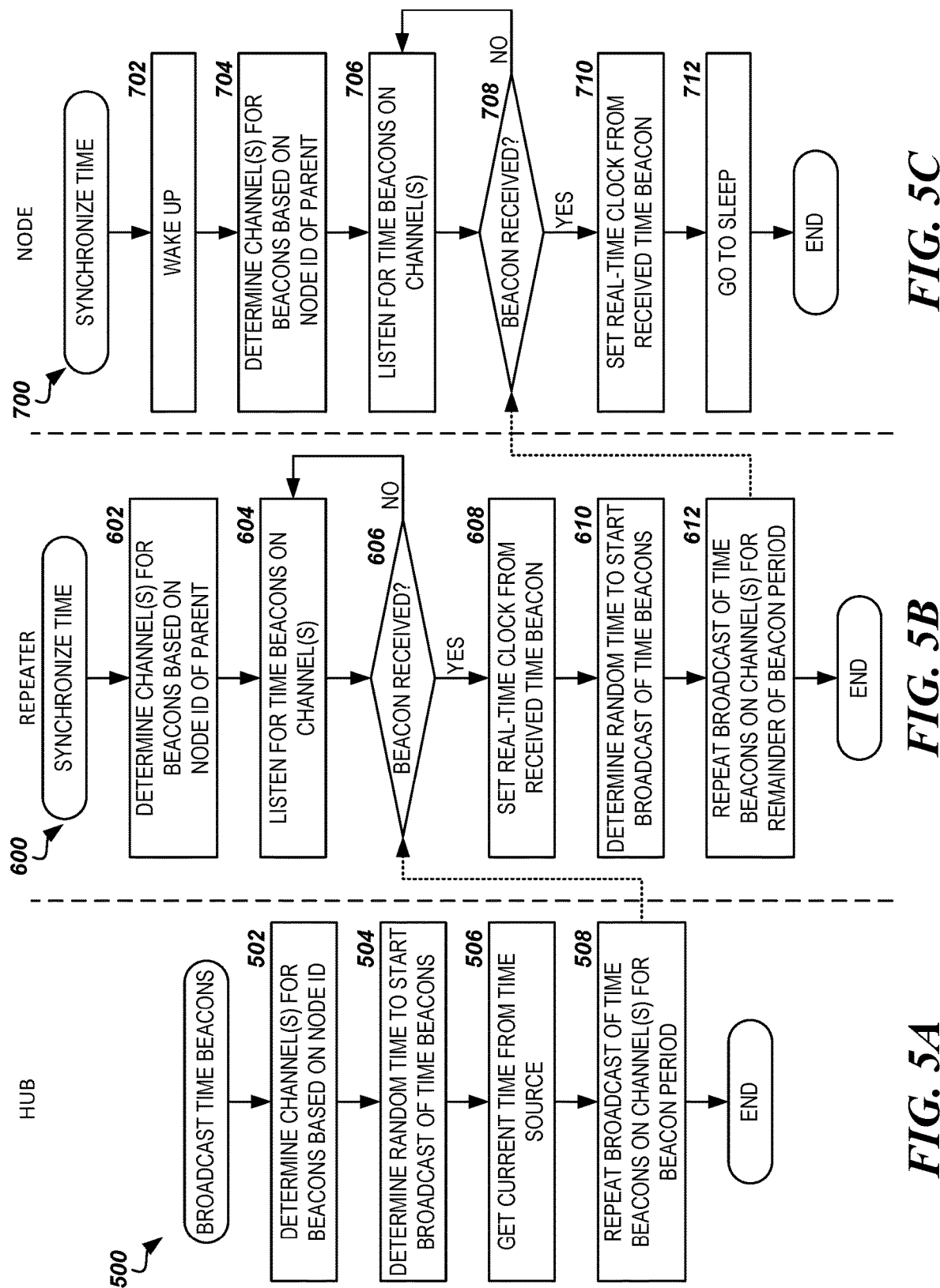
FIGS. 5A-5C are flow diagrams showing routines for time-synchronizing multiple remote network nodes concurrently with time beacons, according to embodiments described herein.

FIGS. 5A-5C are flow diagrams showing methods for time-synchronizing multiple remote network nodes concurrently with time beacons, according to some embodiments. Specifically, FIG. 5A illustrates one routine 500 for initiating the broadcast of time beacons 302 during a beacon period 304, as described above in regard to FIG. 3. According to some embodiments, the routine 500 may be performed by a time synchronization module 252 or other software component executing on a collection hub 108. For example, collection hubs 108 in an AMI system 100 may be programmed to perform the routine 500 at a configured start time each day as part of a time synchronization process. A collection hub 108 with assigned child nodes 104 comprising leak detection devices 106 may be configured to perform the time synchronizing process a short time before the detection devices are set to begin recording acoustic data in order for the devices to have the most accurate current time possible for the recording process. In other embodiments, the routine 500 may be performed by any combination of hosts 102, nodes 104, and/or any other computing platforms known in the art.

The routine 500 begins at step 502, where the collection hub 108 determines the beacon channel(s) to be used for broadcasting the time beacons 302. For example, as described above in regard to FIG. 3, the collection hub 108 may select a pair of beacon channel from a predefined pseudorandom hailing channel frequency set based on the node ID of the hub. In some embodiments, the collection hub 108 may select the pair of sequential channels using the formula:

$$\text{BeaconChPairStart}(CH\text{-}A \text{ and } CH\text{-}B) = (\text{nodeID} \% 25) \times 2$$

Next at step 504, the collection hub 108 determines a random time in the beacon period 304 in which to broadcast the first time beacon 302A. For example, the collection hub 108 may randomly pick a time within a 500 ms delay period 308 to broadcast a first time beacon 302A on the first beacon channel (CH-A) of the selected pair. This timing randomness may introduce jitter in the timing of the time beacons 302 in order to minimize collisions with other time beacon messages rebroadcast by a repeater 114, a buddy node 104, or another collection hub, as described herein.

From step 504, the routine 500 proceeds to step 506, where the collection hub 108 retrieves a current time value from a connected or integrated time source 118. As further described above in regard to FIG. 1, collection hubs 108 in an AMI system may include or be connected to an accurate time source 118. For example, a collection hub 108 may be GPS-enabled and able to receive a highly accurate time value from a GPS system. Other accurate time sources 118 may include a cellular network connection, an integrated, accurate real-time clock component, and the like. In addition to retrieving a current time value, the collection hub 108 may determine a ClkHopCnt value that indicates a relative accuracy of the current time value to be included in the first time beacon 302A. For example, a GPS-enabled collection hub 108 may set the ClkHopCnt in broadcasted time beacons 302A-302E to zero (0x00) indicating that the hub is GPS-locked and the current time value is of the highest value.

The routine 500 proceeds from step 506 to step 508, where the collection hub 108 repeatedly broadcasts time beacons 302 on the beacon channel(s) over the beacon period 304. According to some embodiments, the collection hub may broadcast the first time beacon 302A on the first beacon channel (CH-A) of the selected pair of beacon channels, wait the 500 ms window period 306A, and then transmit a second time beacon 302B on the second beacon channel (CH-B). This pattern may then repeat over the 10-second beacon period 304, with the collection hub 108 alternating the beacon channel on which time beacons are broadcast, as shown at 302C, 302D, and 302E in the timing diagram 300 of FIG. 3. The collection hub 108 obtains an updated current time value from the accurate time source 118 before broadcasting each time beacon 302A-302E. Upon expiration of the beacon period 304, the broadcast of time beacons 302 stops and the routine 500 ends.

FIG. 5B illustrates one routine 600 for performing a time synchronization process in a repeater node configured to both receive and rebroadcast time beacons 302. According to some embodiments, the routine 600 may be performed by the time synchronization module 252 or other software component executing on a repeater 114 or other node 104 in the AMI system 100 configured with both BeaconRX and BeaconTX flags set to enabled, for example. As described above, repeaters 114 and child nodes 104 in the AMI system 100 may be programmed to perform the routine 600 at the same start time as the assigned parent collection hub 108 is programmed to perform the routine 500 described above in regard to FIG. 5 as part of the time synchronization process. In other embodiments, the routine 500 may be performed by any combination of repeaters 114, nodes 104, and/or any other computing platforms known in the art.

The routine 600 begins at step 602, where the repeater 114 determines the beacon channel(s) on which to listen for time beacons 302 from its assigned parent collection hub 108. For example, the repeater 114 may determine the beacon channels used by the collection hub 108 based on the node ID of the hub using the same or a similar formula described above for the hub to select the beacon channel(s) from the predefined pseudorandom hailing channel frequency set. Next at step 604, the repeater 114 listens for time beacons 302 on the determined beacon channel(s). According to some embodiments, the repeater 114 may listen for a first listening period 402A to the first beacon channel (CH-A) and then for a second listening period 402B to the second beacon channel (CH-B), as shown in FIG. 4. In some embodiments, the listening periods 402A and 402B may comprise 1 second. If no time beacon 302 is detected on the beacon channel(s), as shown at step 606, the routine 600 returns to step 604 where the listening process is repeated, alternating the beacon channels, until a time beacon 302 is detected.

If, at step 606, a time beacon 302 is received, the routine 600 proceeds to step 608, where the repeater 114 validates the beacon message (e.g., checks the source, ClkHopCnt, CRC, etc.) and then sets its real-time clock from the current time value specified in the time beacon. From step 608, the routine 600 proceeds to step 610, where the repeater 114 determines a random time to start rebroadcast of time beacons 302 on the determined beacon channels. For example, the repeater may pick a random time within a 450 ms delay period 310 of receiving the time beacon 302 from the collection hub 108.

From step 610, the routine 600 proceeds to step 612, where the repeater 114 repeatedly broadcasts time beacons 302 on the beacon channel(s) over the remainder of the beacon period 304. For example, the repeater 114 may broadcast a first time beacon 302F on the first beacon channel (CH-A), wait the 500 ms window period 306B, and then transmit a second time beacon 302G on the second beacon channel (CH-B), as shown in FIGS. 3 and 4. This pattern may then repeat over the remainder of the 10-second beacon period 304, with the repeater 114 alternating the beacon channel on which time beacons are broadcast, as shown at 302H and 302J. Each time beacon 302F-302J will contain a current time value sourced from the real-time clock of the repeater 114. In some embodiments, the repeater 114 may also increment the ClkHopCnt value received in the time beacon 302D from the collection hub 108 and use the incremented ClkHopCnt value in time beacons 302F-302J broadcast by the repeater. Upon expiration of the beacon period 304, the broadcast of time beacons 302 stops and the routine 600 ends.

FIG. 5C illustrates one routine 700 for performing a time synchronization process in a node 104 configured to receive time beacons 302. According to some embodiments, the routine 700 may be performed by the time synchronization module 252 or other software component executing on a battery-powered node 104 connected to a leak detection device 106 in the AMI system 100 configured with the BeaconRX flag set to enabled, for example. In other embodiments, the routine 700 may be performed by any combination of nodes 104 and/or any other computing platforms known in the art.

The routine 700 begins at step 702, where the node 104 wakes up in order to perform the time synchronization process. As described above, battery-powered child nodes 104 in the AMI system 100 may be configured to wake up at the same start time that their assigned parent collection hub 108 is programmed to begin broadcasting time beacons 302. For child nodes 104 comprising leak detection devices 106, this time may be a short time before the detection devices are set to begin recording acoustic data in order for the devices to have the most accurate current time possible for the recording process.

From step 702, the routine 700 proceeds to step 704, where the node 104 determines the beacon channel(s) on which to listen for time beacons 302 from its assigned parent collection hub 108. For example, the node 104 may determine the beacon channels used by its parent collection hub 108 based on the node ID of the hub using the same or a similar formula described above for the hub to select the beacon channel(s) from the predefined pseudorandom hailing channel frequency set. Next at step 706, the node 104 listens for time beacons 302 on the determined beacon channel(s). According to some embodiments, the node 104 may listen for a first listening period 402A to the first beacon channel (CH-A) and then for a second listening period 402B to the second beacon channel (CH-B), as shown in FIG. 4. In some embodiments, the listening periods 402A and 402B may comprise 1 second. If no time beacon 302 is detected on the beacon channel(s), as shown at step 708, the routine 700 returns to step 706 where the listening process is repeated, alternating the beacon channels, until a time beacon 302 is detected.

If, at step 708, a time beacon is received, such as time beacon 302D, the routine 700 proceeds to step 710, where the node 104 validates the beacon message (e.g., checks the source, ClkHopCnt, CRC, etc.) and then sets its real-time clock from the current time value specified in the time beacon 302D. According to some embodiments, from step 710, the routine 700 proceeds to step 712, where the node 104 goes back to sleep in order to preserve battery power. From step 712, the routine 700 ends. In other embodiments, the node 104 may check the ClkHopCnt value in the received time beacon 302D, and if ClkHopCnt value is not 0, the routine 700 may return to step 706, where the node continues to listen on alternating beacon channels until the end of the beacon period 304 in order to detect a time beacon 302 with a more accurate current time value with which to synchronize its real-time clock.

Based on the foregoing, it will be appreciated that technologies for time-synchronizing multiple remote network nodes concurrently with time beacons are presented herein. While embodiments are described herein in regard to nodes an AMI system, those having ordinary skill in the art will recognize that the present disclosure may be utilized in other systems where accurate time synchronization amongst nodes is desired and required to be performed in an efficient processing manner. The above-described embodiments are merely possible examples of implementations, set forth for a clear understanding of the principles of the present disclosure.

The logical operations, functions, or steps described herein as part of a method, process or routine may be implemented (1) as a sequence of processor-implemented acts, software modules, or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A method for time-synchronizing multiple nodes of a network concurrently comprising steps of:
    determining, by a hub device, a plurality of beacon channels over which to broadcast time beacons,
    at a preconfigured start time, broadcasting, by a hub device, a first time beacon containing a current time value retrieved from an accurate time source on one of the plurality of beacon channels;
    periodically repeating, by the hub device, the broadcasting of the first time beacon on alternating beacon channels of the plurality of beacon channels over a beacon period;
    at the preconfigured start time, listening, by a first node of the network, on the plurality of beacon channels for time beacons;
    receiving, at the first node, a received time beacon broadcast by the hub device; and
    setting, by the first node, a real-time clock of the node to the current time value in the received time beacon.

2. The method of claim 1, further comprising:
    determining, by the hub device, a random time in a first delay period; and
    waiting, by the hub device, the random time before broadcasting the first time beacon.

3. The method of claim 1, wherein the hub device determines the plurality of beacon channels over which to broadcast time beacons based on a node ID configured for the hub device, and wherein listening by the first node comprises repeatedly listening for a listening period on alternating beacon channels.

4. The method of claim 1, further comprising:
    upon setting the real-time clock of the first node to the current time value, waiting, by the first node, a random time in a second delay period; and
    after waiting the random time, periodically broadcasting, by the first node, time beacons containing a current time value retrieved from the real-time clock over a remainder of the beacon period.

5. The method of claim 4, further comprising:
    at the preconfigured start time, listening, by a second node of the network, for time beacons;
    receiving, at the second node, a received time beacon broadcast by the first node; and
    setting, by the second node, a real-time clock of the second node to the current time value in the received time beacon.

6. The method of claim 4, wherein the first node comprises a repeater in the network.

7. The method of claim 1, wherein the accurate time source comprises a GPS receiver.

8. The method of claim 1, wherein each time beacon comprises an indication of a relative accuracy of the current time value contained therein.

9. The method of claim 1, wherein the network is utilized to connect hub devices and node devices in an Advanced Metering Infrastructure ("AMI") system.

10. The method of claim 9, wherein the first node is connected to a leak detection device in the AMI system.

11. The method of claim 10, wherein the preconfigured start time comprises a short time before the leak detection device is configured to perform acoustic data recording.

12. A system comprising:
  a collection hub in an advanced metering infrastructure ("AMI") network connected to an accurate time source and configured with a start time, a beacon period, the collection hub further configured to
  determine one or more beacon channels on which to broadcast time beacons,
  at the start time, repeatedly broadcast time beacons on the one or more beacon channels over the beacon period, each time beacon containing a current time value retrieved from the accurate time source; and
  a child node in the AMI network configured with the start time, the child node further configured to
  determine the one or more beacon channels to which to listen,
  at the start time, listen for time beacons on the one or more beacon channels, and
  upon receiving a time beacon broadcast by the collection hub, set a real-time clock of the child node to the current time value in the received time beacon.

13. The system of claim 12, wherein the one or more beacon channels comprise a pair of hailing channels, wherein repeatedly broadcasting time beacons by the collection hub comprises periodically broadcasting time beacons on alternating hailing channels, and wherein listening for time beacons on the one or more beacon channels by the child node comprises repeatedly listening on alternating hailing channels for a listening period until a time beacon is detected.

14. The system of claim 12, further comprising a repeater in the AMI network configured with the start time, the repeater further configured to:
  determine the one or more beacon channels to which to listen;
  at the start time, listen for time beacons on the one or more beacon channels;
  upon receiving a time beacon broadcast by the collection hub, set a real-time clock of the repeater to the current time value in the received time beacon;
  determine a random time within a second delay period to start broadcasting time beacons; and
  after waiting the random time, repeatedly broadcast time beacons on the one or more beacon channels for a remainder of the beacon period, each time beacon containing a current time value retrieved from the real-time clock of the repeater.

15. The system of claim 12, wherein the accurate time source comprises a GPS receiver.

16. The system of claim 12, wherein each time beacon comprises an indication of a relative accuracy of the current time value contained therein.

17. The system of claim 12, wherein the child node is connected to a leak detection device in the AMI network, and wherein the start time comprises a short time before the leak detection device is configured to perform acoustic data recording.

18. A non-transitory computer-readable storage medium having processor-executable instructions stored thereon that, when executed by a processor in a node of an advanced metering infrastructure ("AMI") system configured as a collection hub, cause the processor to:
  determine one or more beacon channels on which to broadcast time beacons; and
  at a preconfigured start time, repeatedly broadcast time beacons on the one or more beacon channels over a beacon period, each time beacon containing a current time value retrieved from an accurate time source connected to the collection hub.

19. The non-transitory computer-readable storage medium of claim 18, having further having processor-executable instructions stored thereon that, when executed by a processor in a node of the AMI system configured as a child node, cause the processor to:
  determine the one or more beacon channels to which to listen;
  at the preconfigured start time, listen for time beacons on the one or more beacon channels; and
  upon receiving a time beacon broadcast by the collection hub, set a real-time clock of the child node to the current time value in the received time beacon.

20. The non-transitory computer-readable storage medium of claim 18, having further having processor-executable instructions stored thereon that, when executed by a processor in a node of the AMI system configured as a repeater, cause the processor to:
  determine the one or more beacon channels to which to listen;
  at the preconfigured start time, listen for time beacons on the one or more beacon channels;
  upon receiving a time beacon broadcast by the collection hub, set a real-time clock of the repeater to the current time value in the received time beacon;
  determine a random time within a second delay period to start broadcasting time beacons; and
  after waiting the random time, repeatedly broadcast time beacons on the one or more beacon channels for a remainder of the beacon period, each time beacon containing a current time value retrieved from the real-time clock of the repeater.

* * * * *